Figures 1, 2:
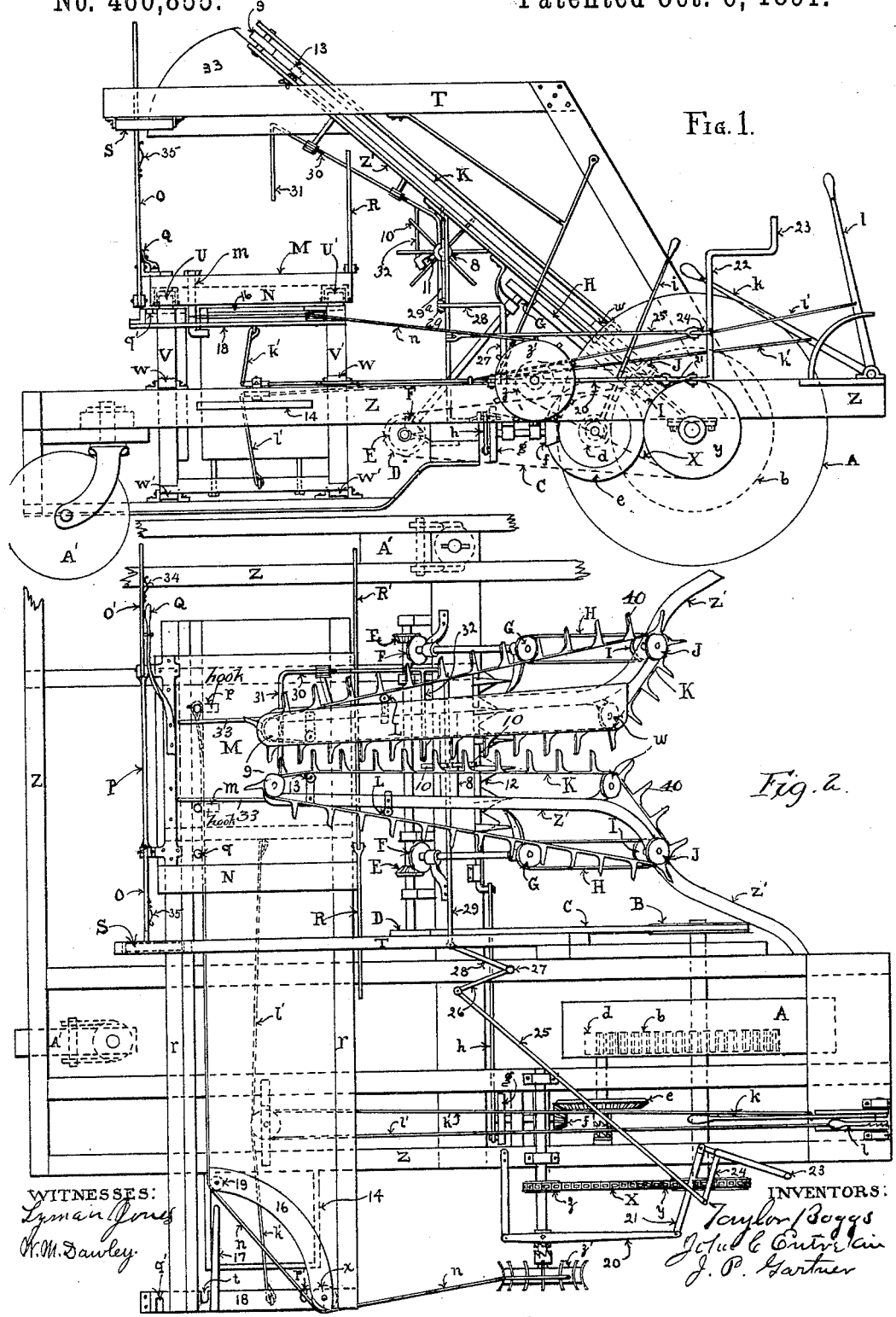

(No Model.) 3 Sheets—Sheet 1.

J. C. ENTREKIN, T. BOGGS & J. P. GARTNER.
CORN HARVESTER.

No. 460,855. Patented Oct. 6, 1891.

WITNESSES:
Lyman Jones
W. M. Dawley

INVENTORS:
Taylor Boggs
John C. Entrekin
J. P. Gartner (No Model.) 3 Sheets—Sheet 2.
J. C. ENTREKIN, T. BOGGS & J. P. GARTNER.
CORN HARVESTER.
No. 460,855. Patented Oct. 6, 1891.
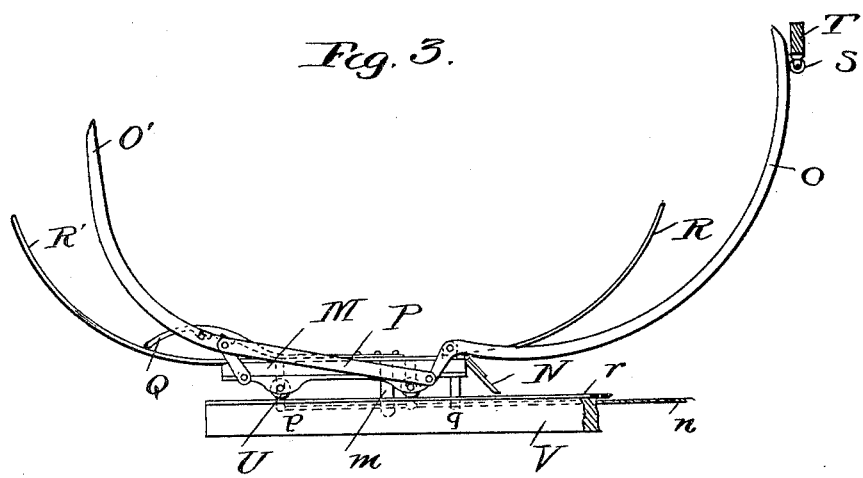
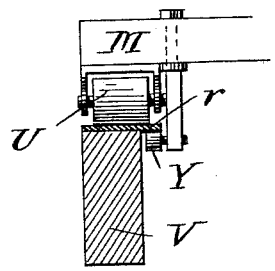
Witnesses.
W. P. Keene.
F. L. Middleton
Inventors
John C. Entrekin
Taylor Boggs
J. P. Gartner
by Ellis Spear Atty.

(No Model.) 3 Sheets—Sheet 3.
J. C. ENTREKIN, T. BOGGS & J. P. GARTNER.
CORN HARVESTER.
No. 460,855. Patented Oct. 6, 1891.
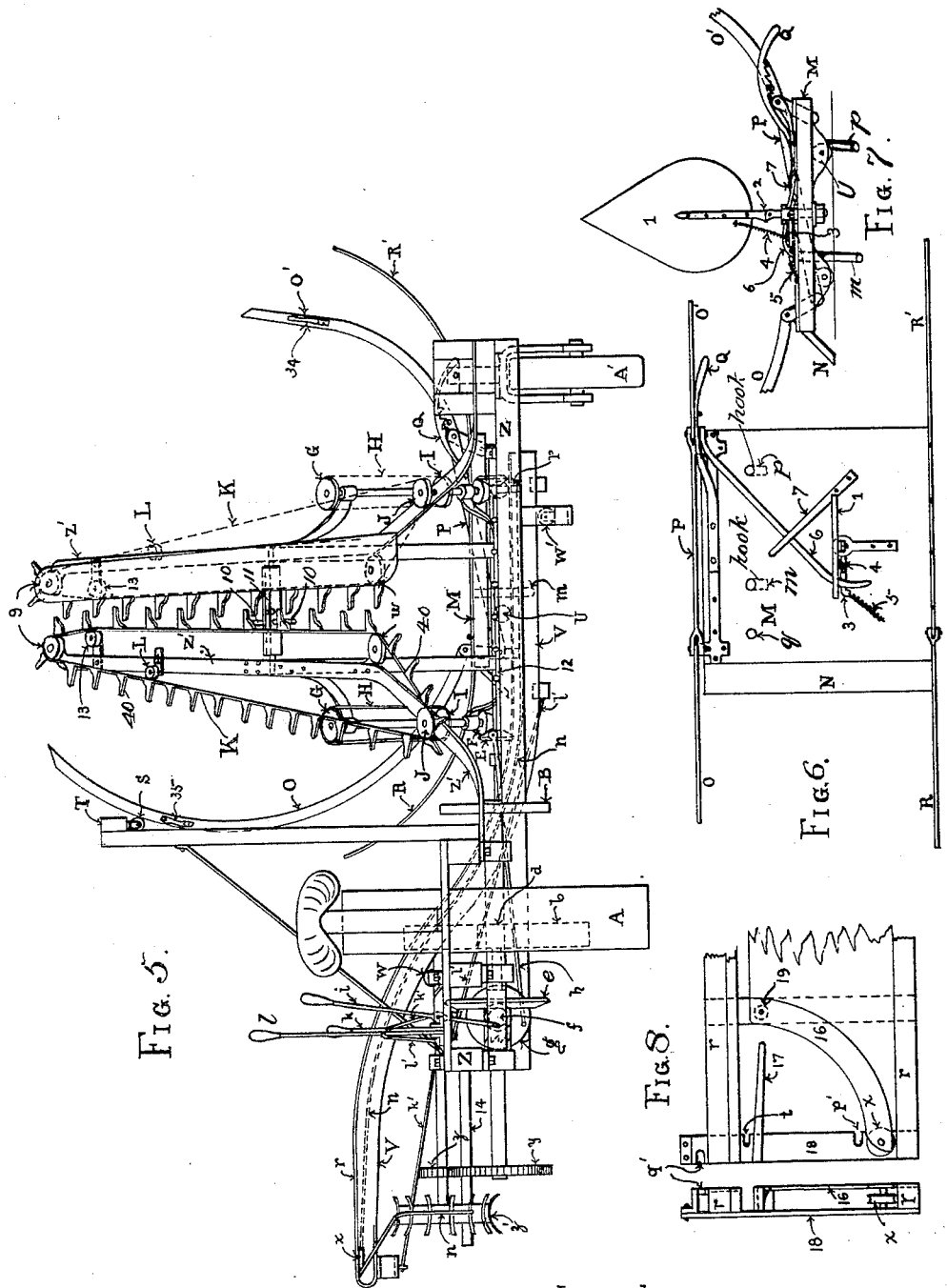

United States Patent Office.

JOHN C. ENTREKIN, TAYLOR BOGGS, AND JOHN P. GARTNER, OF CHILLICOTHE, OHIO.

CORN-HARVESTER.

SPECIFICATION forming part of Letters Patent No. 460,855, dated October 6, 1891.

Application filed September 30, 1890. Serial No. 366,657. (No model.)

*To all whom it may concern:*

Be it known that we, JOHN C. ENTREKIN, TAYLOR BOGGS, and JOHN P. GARTNER, citizens of the United States of America, residing at Chillicothe, in the county of Ross and State of Ohio, have invented certain new and useful Improvements in Corn-Harvesters, of which the following is a specification.

Our said invention is an improvement upon the general form of corn-harvesters represented by the patent granted to Taylor Boggs by the United States Patent Office on the 23d day of July, 1889, No. 407,633.

The principal object of our invention and the main feature of the improvement relates to the mechanism for carrying back the corn from the cutter to the rear of the machine. In connection with the apparatus for thus carrying back the corn we have shown a laterally-movable carriage, on which the shock is formed and moved laterally, and to which the apparatus above referred to delivers the corn.

Our invention includes, also, details of construction relating to the machine.

Our invention is illustrated in the accompanying drawings, in which—

Figure 1 shows the machine in which our invention is embodied in side elevation. Fig. 2 represents the machine in plan view. Fig. 3 illustrates the details of the arms which compress the shock. Fig. 4 is a detail of the truck-rollers and track. Fig. 5 is a front elevation of the machine. Fig. 6 represents in a plan view the carriage and arms. Fig. 7 is a side elevation of the carriage; Fig. 8, a plan view of the outer end of the track.

In the drawings, Z indicates the main frame of the machine. Its forward end on the right-hand side is supported by the main driving-wheel A, while the other parts are supported upon casters, (indicated at A'.)

The sickle-bar 12 is driven from the main wheel A through pitman $h$, which connects it with a wrist-pin on a face-place $g$, which is on a shaft mounted in the frame, having a bevel-pinion $f$ engaging with the bevel-gear $e$, on a shaft carrying a pinion $d$, engaging with a gear-wheel $b$ on the same shaft with the main wheel A.

The conveyer by means of which the corn carried backward is supported in suitable frame-work in an inclined position over the cutter-bar, the upper part extending to the rear, so that the corn is carried upward and backward. The conveyer has a supporting-frame for supporting the elevator-chains, which consists, preferably, of iron bars, (marked $Z'$ $Z'$.) The lower ends of these are bent, as shown in Fig. 2, and are supported upon the adjacent main beams of frame Z, as shown more clearly in Fig. 2. The lower part of the frame is there represented as directly connected with the frame Z. The upper part is broken away for convenience, but is shown in Figs. 1 and 5. Supported upon this frame $Z'$ are two endless bands K, constituting a pair and moving in unison. They are shown more clearly in Fig. 2. The bands K are mounted upon pulleys and carry outwardly-projecting arms 40, which move in the same inclined plane in which the endless bands are set. The bands on those parts which lie opposite each other—that is to say, the interior part of the reel or conveyer—run in substantially parallel position most of their length, but preferably diverging slightly about the idler 13. At the lower part of these nearly parallel lines the bands are supported by the idlers $w$. At the upper ends the bands are supported by the idlers 9, and the adjustable tension-idlers 13 are provided for taking up slack of the bands and also for pressing them inward.

At the lower and outer corners are the driving-pulleys J. These are on the upper ends of shafts which have at the lower ends pulleys I, connected by bands H to pulleys G. These pulleys are on the upper ends of inclined shafts. (Shown more clearly in Figs. 1 and 2.) On the lower ends of these shafts are bevel-gears F, which mesh with the bevel-gears E on the common shaft, which is turned by a belt C, connecting wheel D on said shaft with the wheel B on the main driving-shaft, so that while the machine is in motion the reel or conveyer is constantly driven. It will be observed that this conveyer extends downward and forward and across the cutter-bar. At the lower end it has an angular opening formed by the inclined position in which the pulleys $w$ and J are set. Therefore as the machine moves along the inwardly-extending arms 40 gather in the corn, and, if necessary, raise it and bring it between the nearly parallel parts of the band, where it is forced along by the arms, which are arranged, preferably, to interlock until the sickle or other means used for cutting it reaches it. Then it is severed and carried up in the same manner. As, however, the butts hang downward and are the heavier parts, it is necessary to make some provision by means of which the cornstalks can be brought to a horizontal position, in order that they may be laid upon a horizontal surface of the carriage on which the shock is formed, and moved laterally to be dumped, as explained in Letters Patent of Boggs, heretofore referred to. To provide for this, we have arranged underneath the conveyer-frame a transverse deflector or bar, which meets the butts of the corn as the stalks are carried rearwardly, and detains them while the upper parts are moved upwardly and rearwardly, so that stalks are brought to an inclined position and dropped to a horizontal position upon the truck-carriage. Preferably the deflector is made in the form of the roller, as shown at 8 in Figs. 1 and 2, this being the preferable form, as it facilitates the passage of the stalks by reason of the lessened friction.

There may be also seen in Fig. 1 provision for the automatic turning of the roller 8 by means of the arms 10, which project into the path of the arms 40, and thereby are moved as the arms pass. This transverse deflector is of very great importance in the machine; but the precise form of it is not material, as it may be greatly changed without very materially altering the result. We have also placed upon this roller a radially-arranged bar or part 11, extending the entire length of the roller and adapted to strike the butts of the corn and push them along and keep the roller clear of corn as the roller revolves. The upper end of the conveyer terminates over the middle of the car M when said car is in position to receive the corn to form a shock. The lower end of the frame formed by bars Z' extends outwardly, as shown, to gather in the corn. The machine as shown is intended, however, only for one row of corn; but it may have the parts described in duplicate form or widened in a single form, so as to embrace two or more rows at one time.

At the upper end we have provided guards 33, set vertically, or nearly so, to prevent the corn from falling out laterally and to direct it down upon the carriage.

The carriage M moves laterally in the rear part of the machine in a line parallel to the sickle, and is in its main feature substantially as shown in aforesaid patent; but as to the important details of construction we have improved the machine shown in said patent, as hereinafter explained.

It will be understood that the track is curved or inclined upward on the right-hand side of the machine, as shown in Fig. 5, so that the car runs back by gravity. The left-hand end of the track is shown on the lower level in Figs. 1 and 5, and it rests on the rollers $w'$ $w'$. The right-hand end rests upon the beam of frame Z on the right-hand side of the frame, where are shown the rollers $w$ $w$. (See Fig. 5.)

In our improved form of machine we use a movable track, the sides of which are marked V V'. This movable track rests on the rollers aforesaid and carries the strap-iron facings $r$ $r$, on which the truck or shock-carrier runs. The movable track has a left and right hand movement of about two feet or two and a half feet. It is moved to the right by means of the wire rope $l'$, connected to the hand-lever $l$, and it is moved to the left of the machine by the wire rope $k'$, attached to the lever $k$. The right-hand position is the normal position in which it stands when the truck is receiving its load. It is pulled back toward the left by means of the lever $k$ when the shock has been discharged and the truck is to be relieved from the shock, as hereinafter explained.

The truck has rollers U resting on the track upon which it runs and may have a roller Y bearing on the under side of the facing $r$, which holds the truck down properly, Fig. 4. The holding-down rollers are dispensed with in our preferred form, and the same function is performed by the hooks $m$ and $p$, depending from the under side of the truck.

The truck is drawn to the right by means of a wire rope $n$, which passes around suitable idlers 19 and $x$ to a drum $z'$, which is connected to its shaft through a clutch, the shaft being rotated by the sprocket-wheel $z$, connected to another sprocket-wheel $y$ on the main shaft through a chain X. The clutch is operated by means of levers 20 21, which connect it to an arm on the vertical shaft 22, which is provided with a crank 23, the crank being within reach of the driver. When a shock of sufficient size has been formed upon the truck, the driver throws the clutch into connection with the drum, and the power of the machine then winds up the rope $n$ and draws the truck to the right.

The shock is formed over a spreader 1, represented in Figs. 6 and 7. The purpose of this is to enlarge the base of the shock, so that it may stand more firmly on its base when it is dumped from the truck. The spreader consists of a plate approximately heart-shaped, with the point upward, mounted upon a standard arranged in line with its longer axis. The standard is set about in the middle of the truck, but a little near the front, as shown in Figs. 6 and 7. The point separates the stalks, and they fall about the spreader, which stands in the position shown in Fig. 6, with its plane at right angles to the stalks, and this forms a hollow at the butt-end of the shock when the top end is gathered by the gathering or compressing arms. The mechanisms shown in Figs. 6 and 7 in connection with this spreader are for the purpose of permitting the necessary movement in order to allow it to be withdrawn. Obviously if it were pulled out in the position in which it stands in Fig. 6 the withdrawal would be attended with difficulty and disarrangement of the shock, and for this purpose it is necessary to give it a quarter-turn. The standard of the spreader is provided with a jointed standard, so that it may bend when it is being released from the shock.

On the lower or fixed part of the standard, below the joint 2, is an arm 3, and the part of the standard to which it is attached may be turned in the platform of the truck. A bar 6 is attached to the arm O', as shown in Fig. 6, so that when the compressor-arms are being opened this one pulls upon the bar 6. This bar has a notch on its under side engaging with the arm 3, and when the bar is pulled it pulls the arm 3 around against the spring 5, and thereby gives a quarter-turn to the spreader. The bar 6 is held down by a spring 7. This turn occurs when the truck has arrived at the right-hand limit of its movement and has dumped and the arms have been unclasped from around the shock, and it is at this moment that the driver pulls back the track and with it the truck to withdraw the spreader from the shock. The bar 6 is then raised from the arm 3, and the spring 5 returns the spreader to its normal position. The truck is next turned back on the track and then is drawn back upon the track to its position under the conveying-reel, and the driver operates the lever to pull the track back to the right into its proper position. The shock-spreader operates better when two rows or more of corn are cut simultaneously; but it is practicable with one.

The backward movement of the track is necessary for the reason that the truck when dumped stands close to or bears against the upright shock, which is now resting on the ground, and the truck could not be tilted back again into position on the track and turned unless the track were moved back to free the truck from the shock. The normal position of the track is shown in Fig. 5. The spreader as it is withdrawn from the shock turns down at the point 2 to render the action easy and prevent disarranging the shock. When free from the shock, it is returned to upright position by the spring 4.

The compressing-arms in this form of the machine are the same in principle as those shown in the aforesaid Boggs patent; but they differ in detail of construction. They are shown at O O', and are pivoted on the rear edge of the truck. They are connected, as shown in Fig. 3, by a bar P, pivoted below the pivot of one and above the pivot of the other, so that motion of one is communicated to the other. The longer arm O is on the right-hand side of the truck, and it bears, when open, with the truck in its normal position, against a friction-roller $s$ on the cross-beam T.

It will be apparent from an inspection of Fig. 5 that as soon as the truck starts on its movement to the right the compressor-arm O will be turned inward and downward; and this will draw up its mate O' and thus compress the shock. The arms are caught and held in this position by a catch Q, and as both are on the truck the shock is carried in the compressed condition to the point of delivery. The truck is drawn to the right, is swung around with a quarter-turn, and dumped, and the compressor-arms are opened by hand. The end of the track is shown in Fig. 8 in which the circular track is shown at 16, on which the left-hand rear wheel of the truck slides in turning. The buffer for righting the truck after dumping the shock while the track is run back to clear the shock is shown at 14. The truck strikes against this as the track moves to the left, and it is thus tilted upwardly. There is a spring 17 to insure the direction of the hook $m$, which holds the truck down when dumped and to render this engagement certain with the notch $t$ in the end of the track. The notch $t$, as well as the notch $p'$, is in the iron plate 18, arranged across the end of the track. The notch $p'$ receives the hook $p$ on the truck, which hook also assists in holding the truck when it is dumped. The roller 19 is at one end of the circular segment of track.

It will be observed that the machine is stopped by the striking of the truck-hooks $m$ and $p$ against the plate 18, as this locks the master-wheel and stops the horses. It is necessary, however, to have an arrangement to catch the three or four hills of corn that are cut between the time when the truck leaves its normal position and the time when the machine is stopped by the dumping. For this purpose we have provided arms 31 32, fixed to the shaft 30 and arranged to be dropped down underneath the conveyer and at one side or to be turned up across the passage between the conveyers. When the arms are turned down, as shown in Fig. 1, they are out of the way, and when turned up, as shown in Fig. 2, they catch the corn which drops from the conveyer and hold it. These arms are operated by means of a rod 29, which is connected to an arm 29ᵃ on the rod 30, set at right angles to the arms 31, so that when the arm is pulled to the left by the rod 29 it brings the arms 31 up horizontally. The rod 29 is connected to a crank 28 on the crank-shaft 27, and this shaft has a lower crank 26, connected by rod 25 to another crank-arm 24 on the shaft 22, so that as the clutch is moved to engage with the drum which pulls the truck it also throws up the arms 31 32, and these are thrown down when the clutch is released to allow the truck to return. This arrangement holds up the corn from three or four hills until the truck returns and then drops that which has been held up upon the return-truck. This may be arranged to operate by the driver's foot instead of the crank.

The drawing-rope is attached to the hook p, and at the end of its movement to the right causes the truck to move around on the hook m as a pivot when it is contact with its notch, this occurring when the hook p has passed that point of the track adjacent to the pulley 19, when the continued pull of the rope n draws the hook p toward the pulley x, thus swinging the left-hand end of the truck around to the front on the hook m as a pivot. At the end of the quarter-turn the hook p comes in contact with its notch p', and the butts of the corn forming the shock then project over the edge of the end of the track, and as these butts are much heavier than the top the shock careens and dumps over the outer end of the truck automatically and by gravity until the butts rest upon the ground. The wire or twine may then be tied around it and the arms unlocked and the truck allowed to return.

A stud q projects down from the truck, but is too short to strike the plate 18, and when the truck swings around it engages the notch q', which is in a higher plane, and thus takes up some of the jar and strain. The wheel U is broad enough to pass over the space at the left-hand end of the curved track 16.

A fender N is placed on the truck to prevent any loose stalks from getting under the truck.

The spring-plates 34 and 35 are to hold the twine or wire cut to proper length and placed along the arms so as to receive the corn as it is cut.

We claim as our invention—

1. In combination, the sickle or cutter-bar of a corn-harvester, the means in rear of the cutter-bar for receiving the cut stalks, and means for conveying and causing the stalks to assume a horizontal position, consisting of the rearwardly-extending conveyer and a deflector for moving the stalks upwardly, said deflector being arranged in a plane above the cutter-bar and the receiving means, and said deflector extending transversely of the stalk-passage below the conveyer and forward of the rear end of the conveyer, substantially as described.

2. In combination with the supporting-frame and sickle-bar or cutter of a corn-harvester, the rearwardly-inclined conveyer, the deflector extending across the stalk-passage below the conveyer, and a transversely-movable truck, substantially as described.

3. The combination of the conveyer inclined to the sickle-bar or cutter, and the rotary deflector extending across the stalk-passage below the conveyer, substantially as described.

4. In combination with the conveyer arranged inclined to the sickle-bar or cutter, the rotary deflector extending across the stalk-passage below the conveyer and having arms 10, substantially as described.

5. The rotary deflector arranged below and transversely of the conveyer, in combination with the projection 11, substantially as described.

6. The combination, with a conveyer, of a corn-harvester, a laterally-moving track, a laterally-moving truck mounted upon the track, and mechanism for moving and arresting the truck for the purpose of dumping, all substantially as described.

7. In combination with the frame of a corn-harvester, the laterally-movable track, combined with the ropes l' k', the levers arranged in their relation to the driver's position, and a truck mounted upon the track, substantially as described.

8. In combination with the laterally-movable truck of a corn-harvester, the compressor-arms mounted thereon and connected to each other, and means for closing and holding the said arms, substantially as described.

9. In combination with the laterally-moving truck of a corn-harvester, the compressor-arms pivoted thereon and connected to each other and arranged to be closed by a beam or obstruction, substantially as described.

10. In combination with the truck of a corn-harvester arranged to move laterally and dump, a spreader pivoted on said truck and mechanism for holding it in place, substantially as described.

11. In combination with a rearwardly-inclined conveyer, the laterally-moving truck, and mechanism for discharging the shock, the supporting-arms arranged to be moved into position underneath the conveyer and mechanism for operating the same, substantially as described.

12. In combination with the arms arranged to be moved underneath the conveyer, connecting-rods and levers extending to a crank-shaft in reach of the driver, and means for throwing into gear the drum which draws the truck, connected with the same crank-shaft, substantially as described.

13. In combination, in a corn-harvester, cutting devices, a conveyer, a laterally-movable truck arranged to run on a track, a curved guide at the end of the track, and means for drawing the truck to a quarter-turn, the said truck when one-quarter turned being arranged to project over the end of the track and dump by weight of the load, substantially as described.

In testimony whereof we affix our signatures in presence of two witnesses.

JOHN C. ENTREKIN.
TAYLOR BOGGS.
JOHN P. GARTNER.

Witnesses:
LUTHER B. YAPLE,
WILBY G. HYDE.